(12) United States Patent
Wehler et al.

(10) Patent No.: US 7,669,395 B2
(45) Date of Patent: Mar. 2, 2010

(54) FLIP UP ARRANGEMENT FOR A MOWER DECK

(75) Inventors: Todd Wehler, Mount Morris, IL (US); Wayne Shaw, Sugar Grove, IL (US)

(73) Assignee: Woods Equipment Company, Oregon, IL (US)

( * ) Notice: Subject to any disclaimer, the term of this patent is extended or adjusted under 35 U.S.C. 154(b) by 529 days.

(21) Appl. No.: 11/638,651

(22) Filed: Dec. 13, 2006

(65) Prior Publication Data
US 2008/0141640 A1   Jun. 19, 2008

(51) Int. Cl.
*A01D 34/00* (2006.01)
(52) U.S. Cl. .......................................... 56/15.9; 56/14.9
(58) Field of Classification Search .................. 56/15.9, 56/15.8, 14.9, 15.2, 17.1, 17.2, 16.7
See application file for complete search history.

(56) References Cited

U.S. PATENT DOCUMENTS

| | | | |
|---|---|---|---|
| 4,760,686 A * | 8/1988 | Samejima et al. ............. 56/15.8 |
| 4,779,406 A | 10/1988 | Schroeder | |
| 4,829,754 A | 5/1989 | Shimamura et al. | |
| 4,930,801 A * | 6/1990 | Gillund ....................... 280/481 |
| 5,079,907 A | 1/1992 | Sameshima et al. | |
| 5,079,926 A | 1/1992 | Nicol | |
| 5,475,971 A | 12/1995 | Good et al. | |
| 5,528,886 A * | 6/1996 | Esau ........................... 56/14.9 |
| 5,816,035 A | 10/1998 | Schick | |
| 5,927,055 A | 7/1999 | Ferree et al. | |
| 6,079,193 A * | 6/2000 | O'Neill et al. ............... 56/17.1 |
| 6,341,480 B1 | 1/2002 | Dahl et al. | |
| 6,347,503 B1 | 2/2002 | Esau et al. | |
| 6,393,815 B1 | 5/2002 | Funk et al. | |
| 6,434,919 B2 | 8/2002 | Schick | |
| 6,546,707 B2 * | 4/2003 | Degelman et al. ............ 56/15.2 |
| 6,625,968 B2 * | 9/2003 | Gloudemans et al. ........ 56/17.1 |
| 6,786,031 B2 * | 9/2004 | Kalista et al. ................ 56/16.7 |
| 6,988,351 B2 | 1/2006 | Schick et al. | |
| 7,062,898 B2 * | 6/2006 | Sarver et al. ............... 56/320.1 |
| 7,293,398 B2 * | 11/2007 | Koehn ......................... 56/15.9 |
| 7,347,039 B2 * | 3/2008 | Koehn ......................... 56/15.9 |
| 7,451,586 B1 * | 11/2008 | Papke et al. .................. 56/15.9 |
| 2006/0010846 A1 | 1/2006 | Koehn | |

* cited by examiner

*Primary Examiner*—Árpád Fábián-Kovács
(74) *Attorney, Agent, or Firm*—Foley & Lardner LLP

(57) ABSTRACT

An automated system for selecting the cutting height and orientation of a mower deck attached to a power vehicle. An actuator and a system of links and slotted members are configured to operatively couple to a mower deck carriage and a front portion of the mower deck. Operation of the actuator by extending or retracting an actuator length, working in concert with the system of links and members, causes the mower deck to lower or raise in relation to a surface underlying the mower deck. Operation of the actuator further permits the mower deck to be rotated about an axis to and from an operation orientation and a service and or storage orientation. The actuator maintains the position of the mower deck without assistance of additional locking mechanisms or load bearing members. The system is controllable through a single interface convenient to the operator.

28 Claims, 8 Drawing Sheets

FLIP UP ARRANGEMENT FOR A MOWER DECK

FIELD OF THE INVENTION

The present invention relates generally to a mower deck that is mounted to the front of a power vehicle. More particularly, the present invention is directed to a mower deck where the cutting height is selectable and the mower deck is transferable between an operation orientation and a service and/or storage orientation.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Power riding vehicles are commonly employed in commercial and residential settings to facilitate landscape maintenance. The vehicles represent a convenient and efficient means for performing many tasks related to the care and upkeep of a property. A number of implements have been designed to work with the vehicles to accomplish these tasks, and many such implements are readily available in the marketplace. A mower deck that manages the height of vegetation, such as a grass lawn, by way of cutting action is an example of such an implement.

A mower deck is typically attached to the front or rear of the power vehicle such that the mower deck is substantially parallel to the ground underlying the vehicle. To perform the cutting action, an operator maneuvers the vehicle with the attached mower deck over the area containing vegetation to be cut. The mower deck trims vegetation by way of bringing one or more rotating cutting blades, secured within the body of the mower deck, into contact with the grass blades and or other vegetation. The operator may generally adjust the cutting height of the mower to achieve the desired degree of trimming.

It is sometimes necessary to lift the mower deck away from the ground when the mower deck is not in operation for the purpose of accessing systems on the underside of the mower or to more conveniently store the mower. It is desirable to provide a mower deck that can be toggled between a service and or storage orientation and an operation orientation while the mower deck remains attached to the vehicle. It is further desirable to accomplish the orientation change of the mower deck in an efficient manner with a minimal degree of operator interaction and physical exertion and does not require the mower deck to be manually secured in either the operation or the service/storage orientation when transferring the mower deck between orientations. Likewise, it is desirable to accomplish changes in orientation without disconnecting the power take off shaft, deck mount, or other devices communicating between the vehicle and mower deck. A service/storage orientation is generally achieved by raising the deck through a rotation about an axis located near the vehicle from a substantially horizontal operation orientation, proximate the ground, to a substantially vertical orientation. When the mower deck is orientated in the service/storage position, the underside of the mower deck, including the cutting blades, is accessible for cleaning, maintenance, and other service activities. Likewise, it is desirable to provide a service/storage orientation such that the footprint of the combined vehicle and attached mower deck is minimized so as to consume the least possible horizontal storage space.

A number of mower decks have been developed that incorporate systems that permit the mower deck to be placed in a service/storage orientation. However, these systems generally have certain undesirable attributes. For example, U.S. Pat. No. 5,927,055 describes a pivoting mower deck mechanism. However, in this system the operator must dismount the vehicle, disconnect the power take off shaft and disengage a locking mechanism that maintains the mower deck in an operational orientation. Likewise, U.S. Pat. No. 6,347,503 describes a flip-up arrangement for a mower deck where the deck may be moved between an operation orientation and a service/storage orientation. However, again, the operator must disconnect the power take off shaft, attach a deck stand, and unlock securing mechanisms prior to raising the mower deck to the raised position.

It is also desirable to permit adjustment of the cutting height of the mower deck to control the amount of vegetation trimmed when the mower deck passes overhead. It is further desirable to accomplish the height adjustment in an efficient manner with a minimal degree of operator interaction. A number of mower decks have been developed that employ a variety of mechanisms to permit relatively efficient adjustment of the mower deck cutting height. However, each of these designs has certain limitations. For example, U.S. Pat. No. 5,816,035 discloses a mower deck mounting system that permits adjustment of the cutting height. However, to adjust the height in this system the operator must dismount the vehicle, lift an adjustment lever until it disengages from its position aperture, maneuver the lever forward or rearward, and then reengage the lever into a new aperture in order to adjust the cutting height of the deck.

It is further desirable to accomplish adjustment of the mower height and toggling between the operation and service/storage orientations through an automated system but possess certain design or operational limitations. Mower decks that incorporate automation for these tasks have been proposed. For example, U.S. Pat. No. 5,475,971 describes a riding mower where the mower deck may be raised to a service/storage orientation through a system of hydraulic actuators. However, this device requires a second independent set of actuators to adjust the cutting height of the mower. Likewise, U.S. Publication No. 2006/0010846 describes an automated flip-up arrangement for a mower deck. An electronic height adjustment assembly is employed to adjust the cutting height and to move the mower deck between an operation and service/storage orientation. However, a system of spacers that are manually installed onto the mower deck by an operator are employed in conjunction with the electrical actuator to set and secure the deck at the desired cutting height. Similarly, the system of spacers must be manually removed from the mower deck by an operator before the electrical actuator may be employed to raise the mower deck into the service/storage orientation.

Therefore, it is desirable to provide a mower deck with an efficient cutting height adjustment system and an efficient system for changing the orientation of the mower deck between the operation orientation and the service/storage orientation. It is further desirable to provide these distinct functions in a unified mechanism and operator interface to minimize the number of components for ease of manufacturing and ease of use. Furthermore, it is desirable to carry out the functions in an automated manner such that the operator may toggle between service/storage orientations as well as adjust the mower cutting height through one simple interface, thereby avoiding manual intervention during either cutting height adjustment or a change of orientation of the mower deck.

SUMMARY OF THE INVENTION

The present invention provides an automated system for adjusting the cutting height of a mower deck and for raising and lowering a mower deck between a service/storage orientation and an operation orientation where the mower deck is attached to a power vehicle. These features are provided through a single automated unitary system and a single operator interface. Moreover, the system maintains the mower deck at the selected cutting height or in the selected orientation without the use of locking mechanisms, pins, spacers, or other load bearing or securing mechanism. A linear actuator provides a source of locomotion for the adjustment of mower deck cutting height and for the raising and lowering of the mower deck between the service/storage and the operation orientations. The actuator also serves to maintain the mower deck in the selected position.

Operation of the linear actuator is accomplished by an electrical interface. A single electrical interface may be employed to operate the actuator for the cutting height adjustment and for maneuvering the mowing deck to and from the service/storage orientation and the operation orientation. The interface may be located such that it is conveniently accessible to the operator for the adjustment and the maneuvering of the mower deck, such as on or near the power vehicle.

The details of one or more embodiments of the invention are set forth in the accompanying drawings and the description below. Other features, objects, and advantages of the invention will be apparent from the description and drawings, and from the claims.

DETAILED DESCRIPTION OF THE INVENTION

Figure 1:
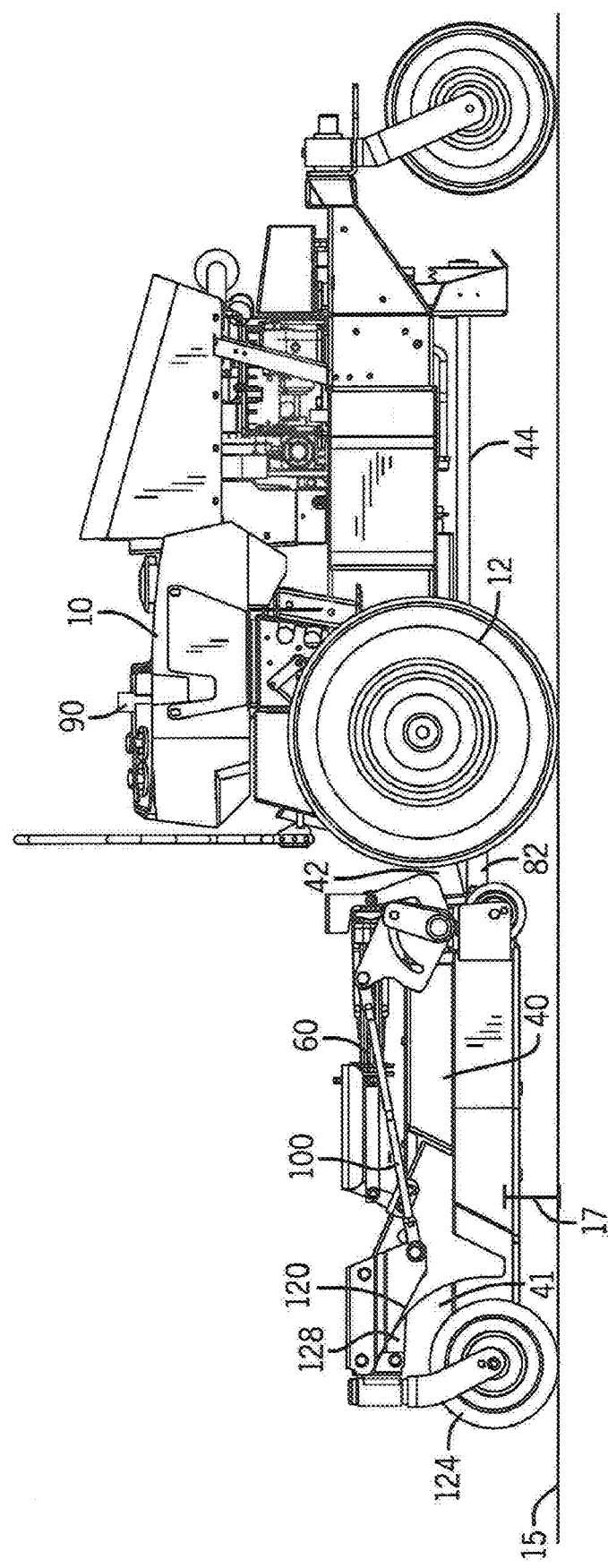
FIG. 1 is a side view of a mower system according to one embodiment of the present invention and showing the mower deck in the operation orientation.
Figure 6:
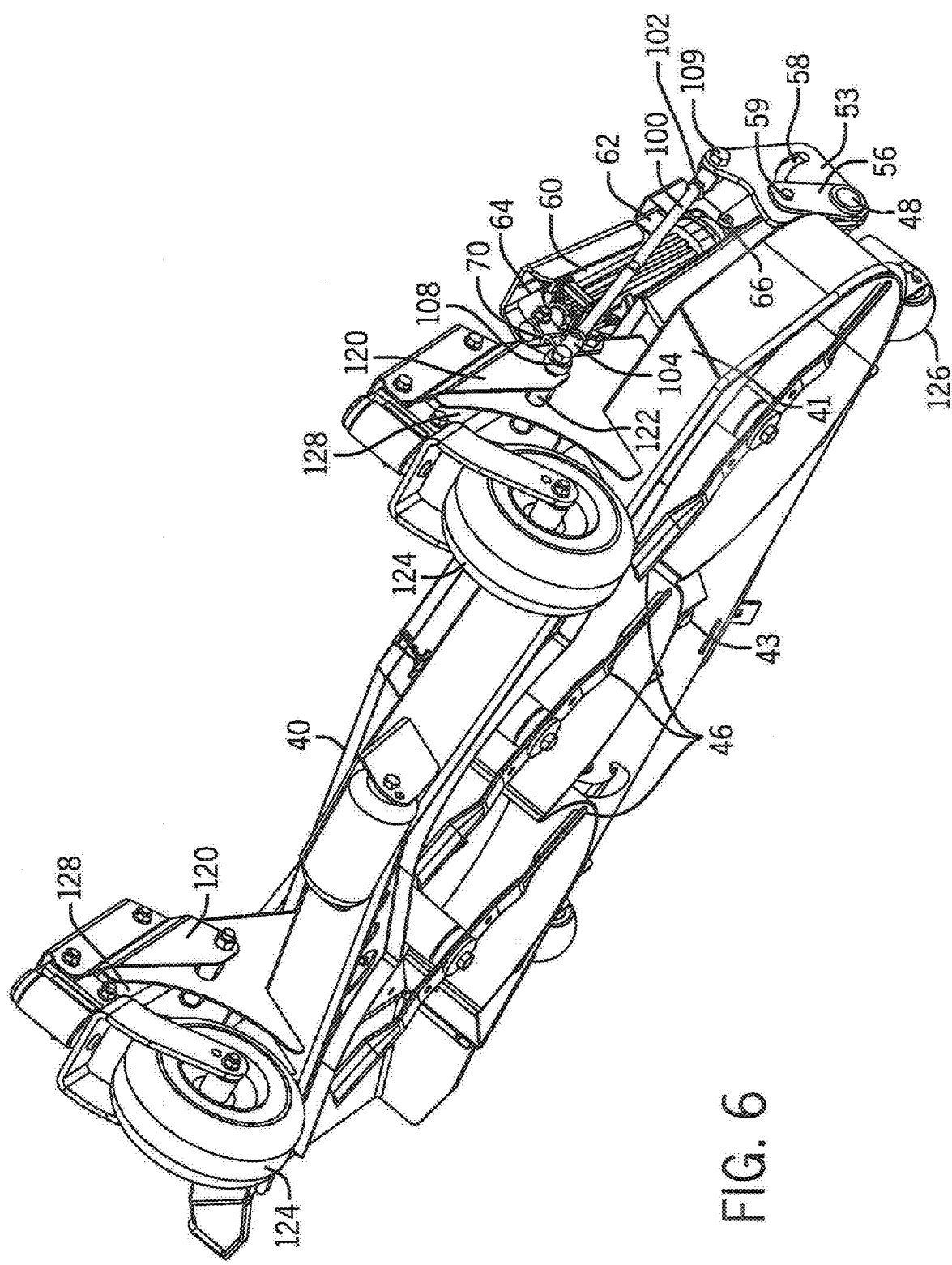
FIG. 6 is a front perspective view showing the mower deck in the service and or storage orientation.

FIG. 1 shows a power vehicle 10 operatively coupled to a mower deck 40 by way of a deck mount system 42 and a power take off ("PTO") 44. The power vehicle 10 is propelled by transferring mechanical energy from the engine (housed within the power vehicle and not shown) to power vehicle wheels 12. Energy from the power vehicle 10 is also transferred to the mower deck 40 by way of the PTO 44 that is operatively connected to drive one or more rotating cutting blades 46, visible in FIG. 6, housed within the mower deck 40. The mower deck 40 is illustrated in an operation orientation in FIG. 1, where the mower deck 40 is substantially parallel to an underlying surface 15. Vegetation is trimmed by directing the power vehicle 10 and the attached mower deck 40 in the operation orientation with rotating cutting blades 46 over the underlying surface 15 having vegetation disposed above the surface. The vertical distance between the surface 15 and the cutting blades 46 is a cutting height range 17. The cutting height range 17 is adjustable within a range suitable for managing vegetation by raising or lowering the mower deck 40 in relation to the surface 15.

Figure 2:
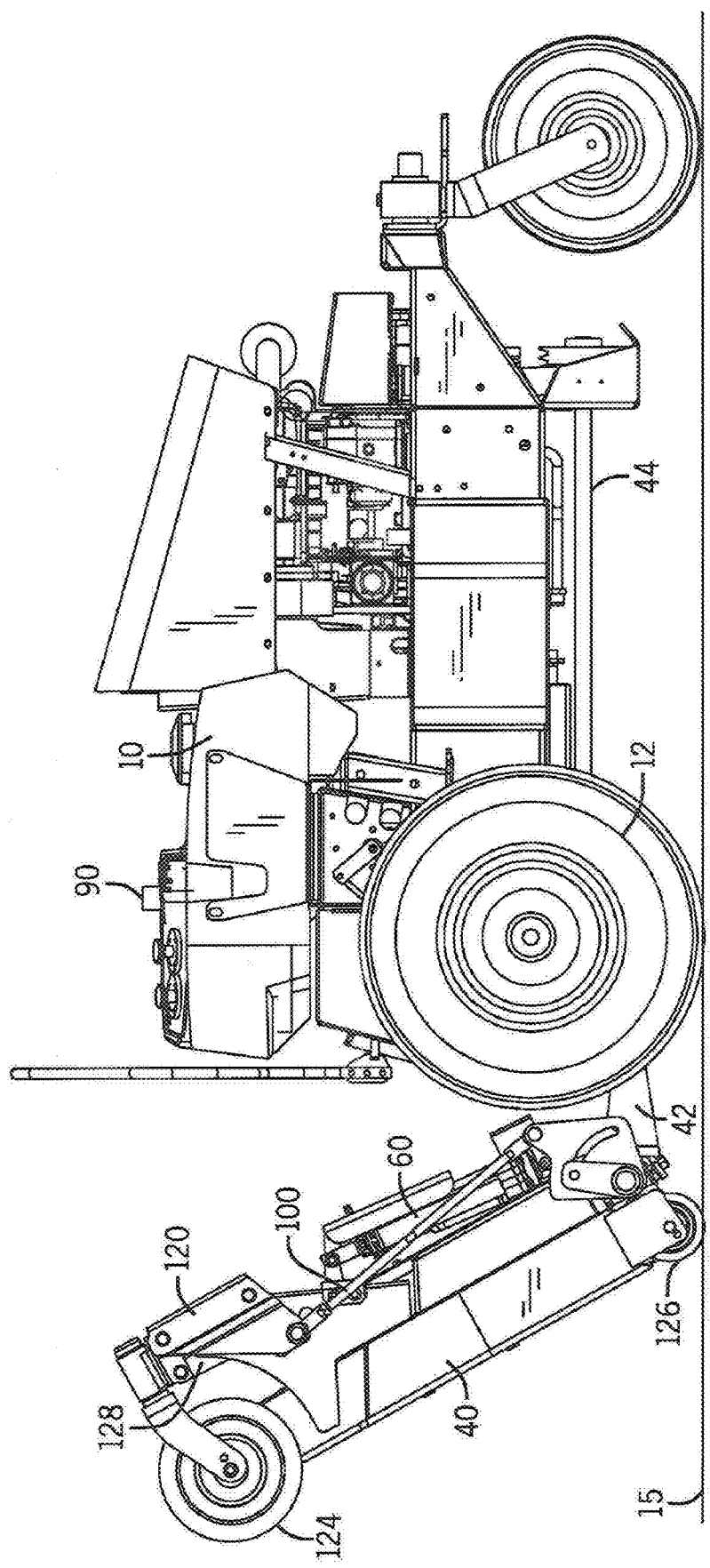
FIG. 2 is a side view of the mower system of FIG. 1 with the mower deck in the service and or storage orientation.

FIG. 2 illustrates the mower deck 40 in a service and or storage orientation, wherein the mower deck 40 is substantially orthogonal to the underlying surface 15. Placement of the mower deck 40 in the service storage orientation permits ready access to the cutting blades 46 and other equipment housed within the mower deck 40 for service, maintenance, and cleaning activities.

Figure 3:
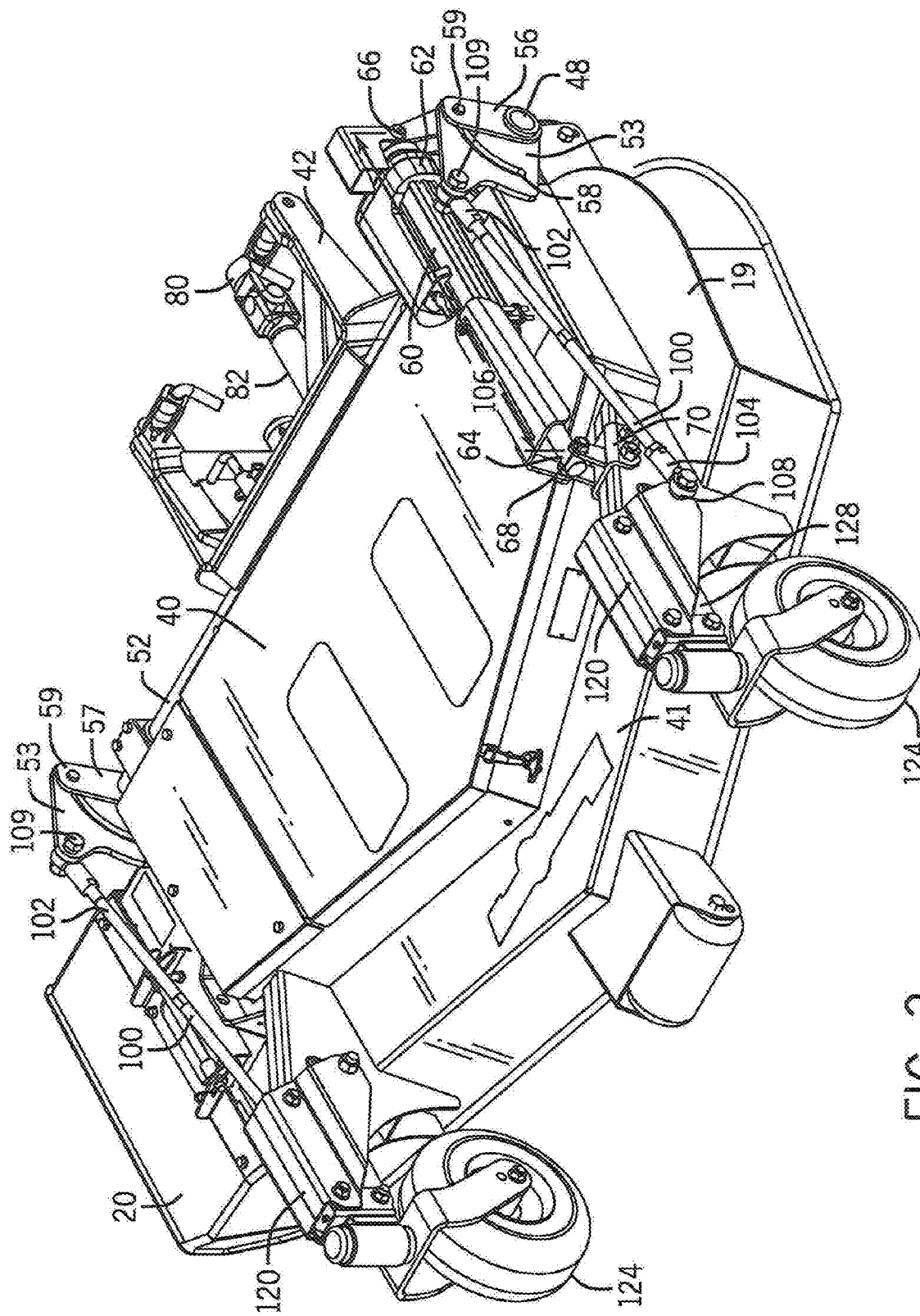
FIG. 3 is a front perspective view of the mower deck of FIG. 1 in the operation orientation.
Figure 5:
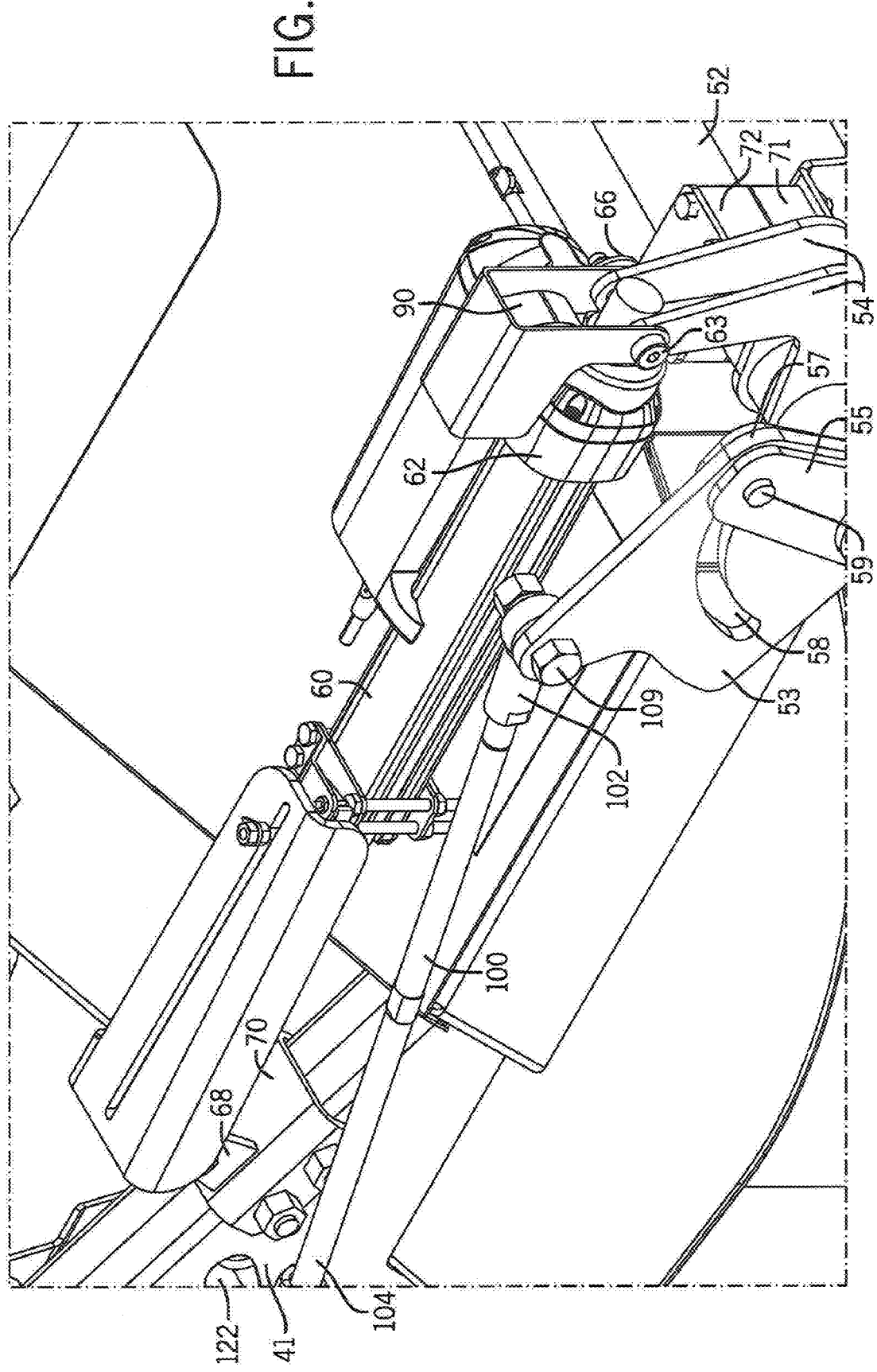
FIG. 5 is a detailed perspective view showing the actuator and accompanying system linkages and their attachment points to the mower deck.

A system for moving the mower deck 40 is described with reference to FIG. 3. Adjustment of the mower deck 40 within the cutting height range 17 and movement between the operation and service/storage orientations is accomplished by the foregoing system. The system is comprised of an actuator body 60 comprised of a first end 62 and a second end 64 and operatively coupled to the rear carriage 50 and mower deck 40 at a first connection location 66 and a second connection location 68, respectively. In one embodiment, the actuator body 60 is a linear actuator. The linear actuator is a mechanism that converts rotational motion provided by a motor into linear translation by way of a plurality of gears and a threaded rod. The actuator 60 includes a first end 62 and a second end 64 separated by a controllable distance 106. The distance 106 is manipulated by operation of an interface 90, as shown in FIG. 5, such as a toggle interface. The distance 106 may be increased by shifting the interface 90 to a first activation position. As shown in FIGS. 1 and 2, the interface 90 may be disposed on the power vehicle 10 such that it is convenient to the operator, but the interface 90 may be located anywhere. Similarly, the distance 106 is reduced by shifting the interface 90 into a second activation position. The selected actuator is capable of raising and lowering the mower deck 40 and maintaining the orientation of the mower deck 40 without the assistance of supplemental pins, spacers, or other restraining devices.

Figure 4:
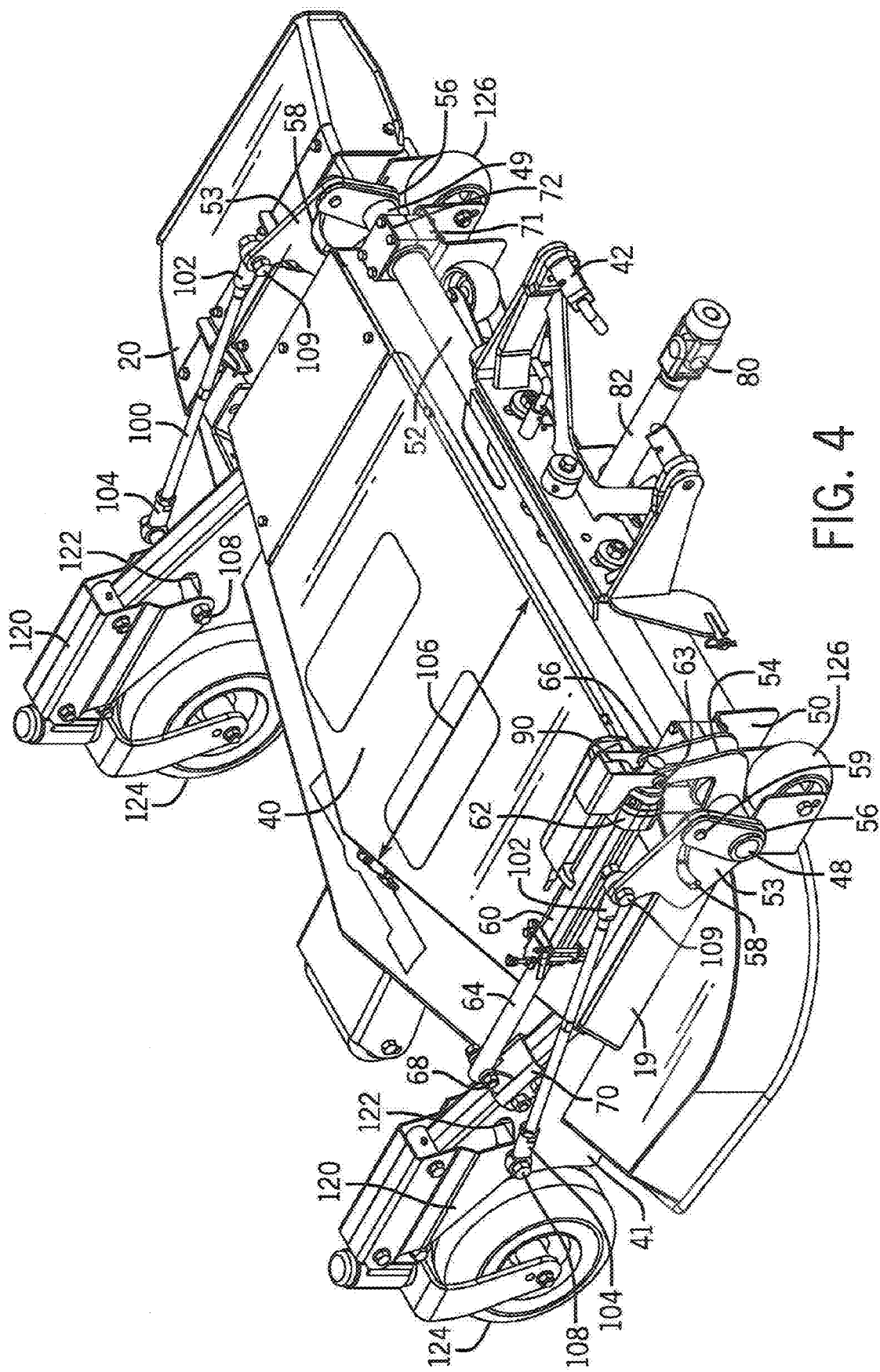
FIG. 4 is a rear perspective view of the mower deck of FIG. 3 illustrating the mower deck in the operation orientation.

As illustrated in FIG. 4, at the first connection location 66, the first end 62 of the actuator body 60 is operatively coupled to a rear carriage 50 that is located toward the rear portion of the mower deck 40. In one embodiment, the rear carriage 50 is comprised of a lift arm 52 having a circular cross-section; two end plate pairs 56; two linkage plates 53; and an actuator mount bracket pair 54. Each end plate pair 56 comprises two plates, a distal plate 55 and a mesial plate 57, best seen in FIG. 5. Each of the distal plate 55 and mesial plate 57 includes a through hole of a diameter sufficient to accommodate the cross-section of the lift arm 52 and disposed on the lift arm 52 in close proximity to one another so as to slidingly accommodate the thickness of the linkage plate 53. The end plate pair 56 is fixedly secured at a first end 48 and a second end 49 of the lift arm 52. The linkage plate 53 includes a through hole of diameter sufficient to accommodate the cross-section of the lift arm 52 such that rotation about the lift arm is unconstrained, and the plate 53 is disposed on the lift arm 52 in the region between the distal end plate 55 and the mesial end plate 57. The linkage plate 53 includes a through slot 58, of an arcuate profile in a particular embodiment. The slot 58 slidingly accommodates a pin 59 that is secured to the distal end plate 55 and the mesial end plate 57. The pin 59 maintains contact with the end of the slot 58 throughout the cutting height range 17. In changing to the service/storage orientation, the pin 59 moves along the slot 58 allowing rotation between the linkage plate 53 and the end plate pair 56. The actuator mount bracket pair 54 includes a pair of plates with through holes of diameter sufficient to accommodate the cross-section of the lift arm 52 and disposed on the lift arm in an orientation to accept the first end 62 of the actuator body 60. The bracket pair 54 and the first end 62 include apertures that accept a pin or fastener 63 that pivotally couples the actuator body 60 to the bracket pair 54.

The lift arm 52 engages the mower deck 40 through a plurality of U shaped bearing blocks 71 and captured by U shaped cap blocks 72 secured to the bearing blocks 71. This arrangement permits the mower deck 40 to rotate about the lift arm 52. The lift arm 52 is coupled to the power vehicle 10 by way of a deck mount 42. A pair of universal joints 80 and drive shaft 82 operatively couple the PTO 44 extending from the power vehicle 10 to a mower deck gearbox 43. The universal joint 80 permits the mower deck 40 to be rotated between the service/storage orientation and the operation orientation without the need for disconnecting the PTO 44 from the drive shaft 82. Likewise, the mower height may be adjusted without disengagement of the PTO 44 from the drive shaft 82.

At the second connection location 68, the second end 64 of the actuator body 60 is operatively coupled to a forward bracket 70. The forward bracket 70 is secured to a front portion 41 of the mower deck 40, thereby operatively coupling the actuator body 60 to the mower deck 40. In the preferred embodiment, the second end 64 includes a through hole proximate the end and through which a fastener or pin passes and engaging an aperture in the forward bracket 70, thereby pivotally coupling the actuator body 60 to the front portion 41 of the mower deck 40.

As illustrated in FIG. 4, one or more of linkages 100 further couples the rear carriage 50 to the front portion of the mower deck 41 on a side 19 of the mower deck 40. A first connection end 102 and a second connection end 104 are disposed at each end of the linkage 100. The linkage 100 is operatively coupled to the rear carriage 50 at the first connection location 109. In one embodiment, the coupling connection is made between the linkage 100 and the linkage plate 53 by way of one or more fasteners or pins interfaced with corresponding apertures disposed on the linkage plate 53 and first connection end 102 of the linkage 100. The linkage 100 is further operatively coupled to the front portion of the mower deck 41 at the second connection location 108. Again, in one embodiment, the coupling connection is between the linkage 100 and a front wheel bracket 120 by way of one or more fasteners or pins interfaced with corresponding apertures disposed on the wheel bracket 120 and second connection end 104 of the linkage 100. In another embodiment, the linkage 100 may be of a nested or other collapsible configuration and operatively coupled to the rear carriage 50 at the first connection location 109 and operatively coupled to the front portion of the mower deck 41 at the second connection location 108. In one embodiment, the wheel bracket 120 is pivotally coupled to the front portion of the mower deck 41 by way of one or more fasteners or pins interfacing an aperture of the wheel bracket 120. A front wheel 124 is coupled to the wheel bracket 120 and a wheel link 128, and the front wheel 124 rolls along the underlying surface 15 during operation of the mower. A slot 122 of an arcuate or inclined profile disposed on the front portion of the mower deck 41 permits the front wheel 124 to be raised and lowered in relation to the mower deck 40 through the pivoting connection between the wheel bracket 120, wheel link 128, and the front portion of the mower deck 41. The assembly described herein can be replicated on the opposing side of the mower deck 20.

The abovementioned components comprise an automated system for maneuvering the mower deck 40. The combination of the actuator body 60, the rear carriage assembly 50, the linkage 100, and the front portion of the mower deck 41 comprise a multi-bar linkage system. The desired displacement and position of the mower deck 40 is achieved by operation of the actuator body 60, constrained by the kinematic properties of the linkage system.

Figure 7:
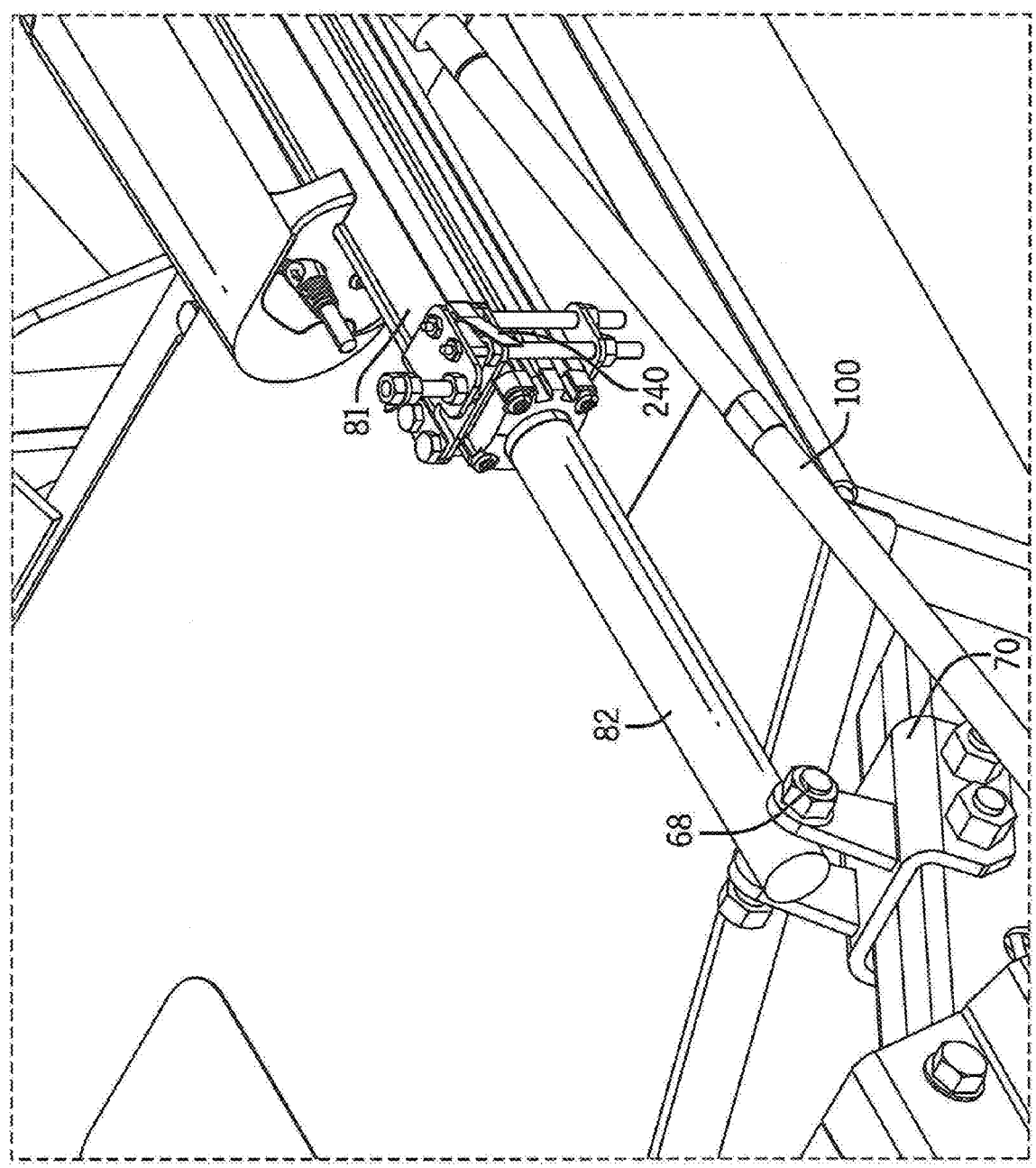
FIG. 7 is a detailed perspective view showing a portion of the actuator and accompanying attachment point to the mower deck.

Raising and lowering the mower deck 40, whether for the purpose of adjusting the mower cutting height or moving between the service/storage orientation and the operation orientation is accomplished by operation of the actuator body 60. Operation of the actuator body 60 causes the controllable distance 106 to vary. Manipulation of the interface 90 causes operation of the actuator body 60, thereby lengthening or shortening the controllable distance 106. As previously described, the actuator may comprise a linear actuator comprised of a housing 81 and a shaft 82 extending from the housing 81, as seen in FIG. 7. Referring to FIG. 4, adjustment of the controllable distance 106 is accomplished by supplying electrical power to the actuator 60, thereby causing a extension or retraction of the shaft 82 relative to the housing 81. In the case of an extension, the controllable distance 106 is extended, inducing an increase in distance between the first connection point 66 and the second connection point 68. Conversely, the distance between the first connection point 66 and the second connection point 68 is reduced when the above operation is reversed by retracting the shaft 82 into the housing 81.

An operator adjusts the cutting height of the mower deck 40 through the process described above. The operator positions the interface 90 in the appropriate position to effect the desired increase or decrease in elevation of the mower deck 40 causing the desired cutting height to be obtained. The described linkage system constrains the motion of the mower deck 40 within the cutting height range to a substantially vertical translation, thereby maintaining the mower deck 40 in an orientation substantially parallel to the underlying surface 15 within the entirety of the cutting height range. Decreasing the cutting height of the mower deck 40 is accomplished by manipulating the interface 90 to an activation position such that the actuator body 60 causes the controllable distance 106 to decrease. The described linkage system responds in concert with the actuator body 60, as the linkage 100 acts upon the front wheel bracket 120, causing the bracket 120 and front wheel 124 to descend down the slot 122 and elevate in relation to the mower deck 40 and thereby lowering the front portion of the mower deck 41 in relation to the surface 15. Concurrently, a rotation of the linkage plate 53 results and thereby lowers the rear carriage 50 of the mower deck 40 a distance substantially equal to that traversed by the front portion 41 of the mower deck 40 and causing the mower deck 40 to descend until the operator returns the interface 90 to the inactive position. The actuator 60 maintains the mower deck 40 at the selected cutting height during the entirety of the mowing operation without subsequent interaction by the operator or activation or installation of locking, spacing, or other load bearing or securing devices.

Increasing the cutting height is accomplished in a like manner. Interface 90 is placed in a second activation position such that the actuator body 60 causes the controllable distance 106 to be lengthened. The described linkage system responds in concert with the actuator body 60, as the linkage 100 acts upon the front wheel bracket 120 causing the wheel bracket 120 to ascend up the slot 122 and in relation to the mower deck 40 and thereby elevating the front portion of the mower deck 41 relative to the surface 15. Concurrently, a rotation of the linkage plate 53 results and thereby raises the rear carriage of the mower deck 50 a distance substantially equal to that traversed by the front portion of the mower deck 41 and causing the mower deck 40 to ascend until the operator returns the interface 90 to the inactive position. The actuator 60 maintains the mower deck 40 at the selected cutting height during the entirety of the mowing operation without subsequent interaction by the operator or activation or installation of locking, spacing, or other load bearing or securing devices.

Figure 8:
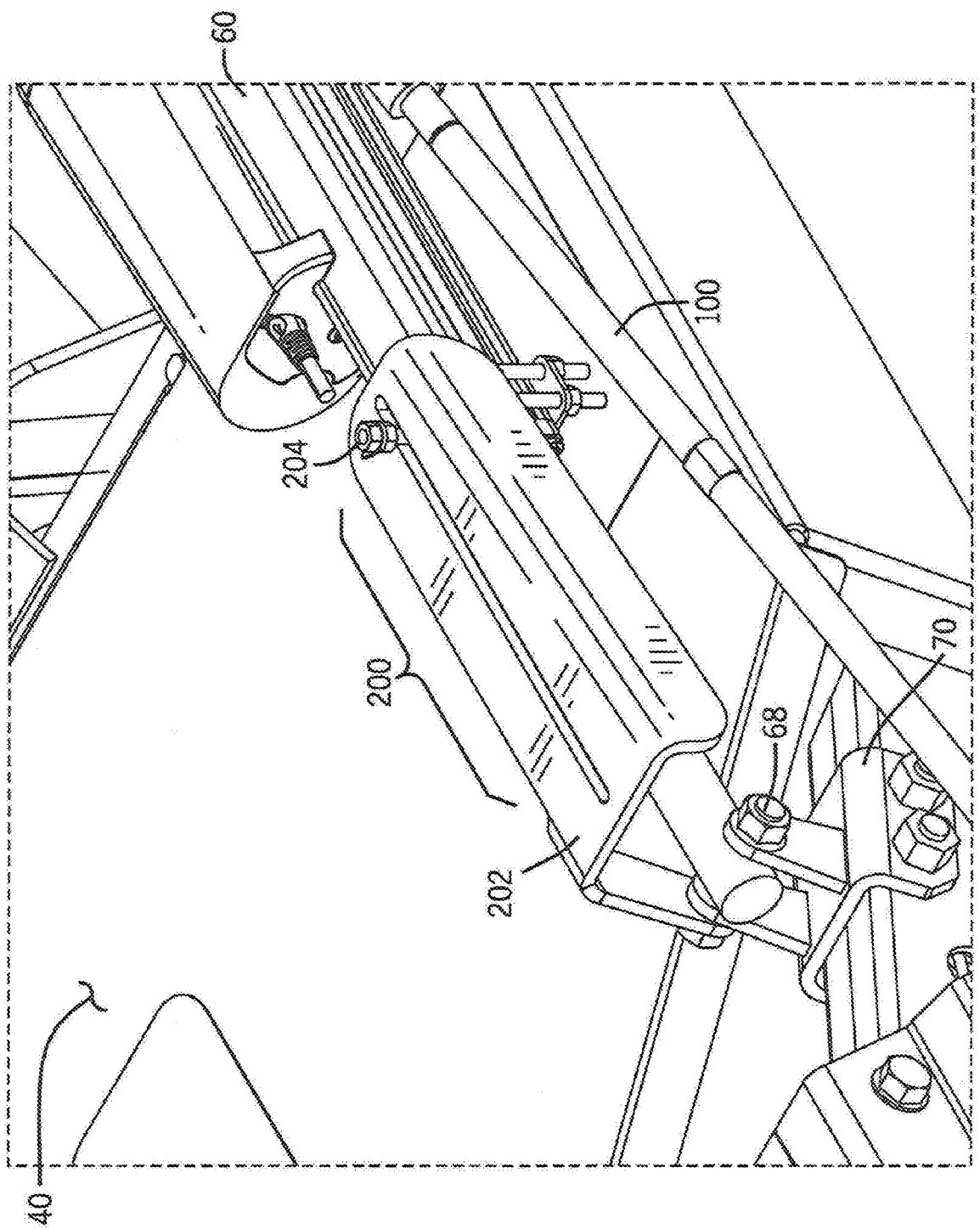
FIG. 8 is a detail perspective view illustrating one embodiment of the cutting height indicator.

An embodiment of the present system further includes a cutting height gauge 200 as illustrated in FIG. 8. The gauge 200 is comprised of an elongated member 202 operatively coupled to the actuator body 60 at the second connection point 68 with the mower body 40 and an indicator 204 operatively coupled to the actuator body 60. At least a portion of the member 202 is preferably graduated or otherwise marked to indicate the cutting height. The cutting height is indicated by the position of the indicator 204 in relation to the member 202. As the cutting height is adjusted and controllable distance 106 of the actuator 60 is altered, the indicator 204 translates relative to the member 202 and the cutting height of the mower deck 40 is thus indicated. It will be understood by one skilled in the art that alternative embodiments may be employed to indicate the cutting height. For instance, the cutting height may also be readily indicated on the linkage plate 53 in conjunction with an additional member operatively coupled to mower deck 40.

An operator transfers the mower deck 40 into the service/storage orientation from the operation orientation in the same manner as previously described for adjusting the cutting height. The mower deck 40 is moved to the service/storage orientation, as illustrated in FIG. 2, by activating the actuator body 60 by placing the interface 90 in the appropriate activation position, causing the controllable distance 106 to decrease, and thus causing the mower deck 40 to descend below the cutting height range. Further retraction of the actuator 60 in this manner causes the mower deck 40 to descend until a set of rear casters 126 located proximate the rear carriage 50 contact the underlying surface 15. Additional retraction of the actuator 60 causes the mower deck 40 to rotate about the lift arm 52, thereby elevating the front portion of the mower deck 41. The mower deck 40 may be raised in this manner until a substantially vertical orientation is achieved. Returning the interface 90 to the inactive position halts the movement of the mower deck 40 and the orientation is maintained by the actuator 60 without additional interaction by the operator or the use of supplementary locking mechanisms, spacers, or other load bearing members. Furthermore, it is unnecessary to disconnect the PTO 44 or deck mount 42 from the mower deck 40 when transferring the mower deck 40 to service/storage orientation. Service of the underside of the mower deck 40 and or storage of the mower deck 40 may be carried out while in the service/storage orientation.

The mower deck 40 is returned to the operation orientation, as shown in FIG. 1, by activating the actuator body 60 by placing the interface 90 in the opposite activation position, causing the controllable distance 106 to increase, and thus causing the front portion of the mower deck 41 to descendingly rotate about the lift arm 52. The mower deck 40 may be lowered in this manner until a substantially horizontal orientation is achieved. Additional extension of the actuator 60 causes the mower deck 40 to elevate, raising one or more of a rear caster 126 from the surface 15, and placing the mower deck 40 in the operation orientation. Returning the interface 90 to the inactive position halts the movement of the mower deck 40 and the orientation is maintained by the actuator 60 without additional interaction by the operator or the use of supplementary locking mechanisms, spacers, or other load bearing members. The operator may continue to raise the mower deck 40 in the above described manner to select the desired cutting height without the need to perform additional operations nor manipulate additional interfaces. Again, orientation of the mower deck 40 is maintained by the actuator 60 without additional interaction by the operator or the use of supplementary locking mechanisms, spacers, or other load bearing members.

An embodiment of the present system further includes a safety interface 240 to automatically shut off power to the PTO 44 when the mower deck 40 moves outside the cutting height range, such as when the mower deck 40 is transferred to the service/storage orientation. Referring to FIG. 7, the interface 240 may be disposed on the actuator body 60 and may readily be incorporated with the height gauge 200. In this configuration, when the mower deck 40 is raised from the operation orientation, the interface 240 is automatically tripped upon exit of cutting height range of the height gauge 200, thereby shutting off power to the PTO 44. One skilled in the art will recognize that a number of alternate safety interface embodiments are feasible.

A number of embodiments of the invention have been described. Nevertheless, it will be understood by those skilled in the art that various modifications may be made without departing from the spirit and scope of the invention. Many changes and modifications within the scope of the present invention may therefore be made without departing from the spirit of the invention, and the invention includes all such changes and modifications.

What is claimed is:

1. A system for orientating a mower deck operatively attached to a power vehicle, comprising:
    a mower deck selectively orientable between a substantially horizontal cutting orientation and a partially elevated service/storage orientation, the mower deck further selectively orientatable in the substantially horizontal cutting orientation to at least a first cutting height and a second cutting height,
    a mower deck carriage configured to operatively couple to the power vehicle and rotatably support the mower deck; and
    a single actuating body operatively coupled to the carriage at a first connection location and to a front portion of the mower deck disposed substantially opposite the carriage at a second connection location, the single actuating body having a selectively adjustable length between the first connection location and the second connection location, the length being controllable by an operator interface in communication with the actuating body and the length defining the orientation of the mower deck, the single actuating body further configured to maintain the orientation of the mower deck free of manual securing devices,
    wherein manipulation of the interface causes the length of the single actuating body to change, the length change acting to rotate the mower deck about the carriage between the first cutting height and the second cutting height, and wherein further change in the length of the single actuating body rotates the mower deck about the carriage, transferring the mower deck between the cutting orientation and the service/storage orientation.

2. The system of claim 1, wherein the operator interface is disposed on the power vehicle.

3. The system of claim 1, wherein the first cutting height and the second cutting height define a cutting height range characterized by a plurality of cutting heights, and wherein the mower deck is selectively orientatable within the cutting height range.

4. The system of claim 1, further including a gauge operatively connected to the mower deck indicating the cutting height of the mower deck.

5. The system of claim 1, wherein the actuating body comprises a linear actuator having a motor, a plurality of gears coupled to a rotatable shaft of the motor, and a threaded rod operatively coupled to the plurality of gears.

6. The system of claim 1, wherein the carriage comprises a lift arm transversely disposed along a rear portion of the mower deck, the lift arm configured to rotationally couple to the mower deck, operatively couple to the power vehicle, and operatively couple to the actuator body at the first connection location such that the change in length of the actuating body causes the mower deck to rotate about the lift arm.

7. The system of claim 6, further including an actuator mount bracket operatively connected to the lift arm and configured to pivotally couple to the actuator body at the first connection location.

8. The system of claim 1, further including a forward bracket disposed on the front portion of the mower deck and configured to pivotally couple to the actuator body at the second connection location.

9. The system of claim 1, wherein the operator interface is operatively connected to the power vehicle.

10. The system of claim 1, wherein the partially elevated service/storage orientation comprises a substantially vertical orientation.

11. A system for orientating a mower deck operatively attached to a power vehicle, comprising:
  a mower deck carriage configured to operatively couple to the power vehicle and to rotatably support the mower deck, the mower deck selectively moveable in a first substantially vertical direction in relation to the power vehicle within a cutting height range and a second direction defined by a rotation between a substantially horizontal orientation and a substantially vertical orientation in relation to the power vehicle;
  a front wheel assembly comprising a front wheel, a wheel bracket, and a wheel link, the assembly operatively coupled to a front portion of the mower deck disposed substantially opposite the carriage;
  a first linkage having a first end and a second end, the first end operatively coupled to the carriage and the second end operatively coupled to the front wheel assembly;
  an actuating body operatively coupled to the carriage at a first connection location and to the front portion of the mower deck at a second connection location, the actuating body having an adjustable length between the first connection location and the second connection location; and
  an operator interface disposed on the power vehicle, the operator interface in communication with the actuating body, the operator interface controlling the adjustable length to automatically move the mower deck in the first direction and the second direction and automatically maintain the orientation of the mower deck in relation to the power vehicle.

12. The system of claim 11, wherein manipulation of the operator interface causes a substantially vertical translation of the wheel assembly in relation to the mower deck, transferring the mower deck in the first direction from a first substantially horizontal orientation characterized by a first cutting height, to a second substantially horizontal orientation characterized by a second cutting height.

13. The system of claim 11, further including a gauge operatively connected to the mower deck indicating the cutting height of the mower deck.

14. The system of claim 11, wherein the actuating body comprises a linear actuator.

15. The system of claim 11, wherein the carriage comprises a lift arm transversely disposed along a rear portion of the mower deck and having a first end and a second end, the lift arm configured to rotationally couple to the mower deck, operatively couple to the power vehicle, and operatively couple to the actuator body at the first connection location such that the change in length of the actuating body causes the mower deck to rotate about the lift arm.

16. The system of claim 15, the carriage further comprising:
  at least one end plate disposed proximate the first end of the lift arm; and
  at least one linkage plate disposed proximate the first end of the lift arm configured to rotationally couple to the lift arm, pivotally couple to the first end of the linkage, the at least one linkage plate including a slot configured to slidingly receive a pin coupled to the at least one end plate.

17. The system of claim 15, wherein the actuator body is coupled to the lift arm by way of an actuator mount bracket, the bracket disposed on the lift arm and configured to pivotally couple to the actuator body at the first connection location.

18. The system of claim 16, wherein the first end of the linkage is pivotally coupled to the linkage plate, the second end of the linkage is pivotally coupled to the wheel bracket and operatively coupled tote wheel link such that the change in length of the actuating body causes a displacement of the linkage such that the front wheel assembly is vertically displaced in relation to the mower deck, thereby vertically translating the mower deck.

19. The system of claim 11, wherein the mower deck includes a first side and a second side, and wherein the at least one wheel assembly and the first linkage is disposed on the first side and further including a second wheel assembly and a second linkage disposed on the second side.

20. The system of claim 11, wherein the actuator body is pivotally coupled to the front portion of the mower deck at the second connection location by way of a forward bracket operatively connected to the front portion of the mower deck.

21. The system of claim 12, wherein further manipulation of the operator interface results in rotation of the mower deck about the carriage in the second direction, transferring the mower deck between one of the first and the second substantially horizontal orientations and the substantially vertical orientation.

22. The system of claim 14, wherein the linear actuator comprises:
  a housing;
  a motor coupled to the housing, the motor controllable by the operator interface;
  a threaded rod coupled to the motor; and
  a plurality of gears coupled to the threaded rod,
  wherein the linear actuator is configured to maintain the orientation of the mower deck when the operator interface stops the motor.

23. A system for orientating a mower deck comprising:

a power vehicle;

a mower deck operatively coupled to the power vehicle, the mower deck automatically orientatable to a plurality of orientations and automatically maintainable in each of the plurality of orientations;

a mower deck carriage configured to engage the power vehicle and to rotatably support the mower deck, the carriage comprising a lift arm transversely disposed along a rear portion of the mower deck and having a first end and a second end, the lift arm rotationally coupled to the mower deck and operatively coupled to the power vehicle;

a first front wheel assembly comprising a front wheel, a wheel bracket, and a wheel link, the assembly operatively coupled to a front portion of the mower deck and disposed substantially opposite the carriage;

a first linkage having a first end and a second end, the first end operatively coupled to the lift arm and the second end operatively coupled to the front wheel assembly;

at least one rear caster operatively connected to the mower deck; and a single linear actuator including a motor and a threaded shaft rotatable by the motor, the single linear actuator operatively coupled to the lift arm at a first connection location and to the moveable mower deck at a second connection location, the single linear actuator having an adjustable length controllable by an operator interface in communication with the actuator, wherein manipulation of the interface modulates the adjustable length and causes a vertical translation of the wheel assembly in relation to the mower deck, transferring the mower deck from a first substantially horizontal orientation defining a first cutting height, to a second substantially horizontal orientation defining a second cutting height, and wherein further manipulation of the interface modulates the adjustable length and results in further vertical translation of the mower deck such that the at least one rear caster engages a surface underlying the mower deck and causes a rotation of the mower deck about the lift arm, transferring the mower deck between one of the first and the second substantially horizontal orientations and a substantially vertical orientation.

24. The system of claim 23, wherein the operator interface is disposed on the power vehicle.

25. The system of claim 23, wherein the mower deck includes a first side and a second side, and wherein the first wheel assembly and the first linkage is disposed on the first side and further including a second wheel assembly and a second linkage disposed on the second side.

26. The system of claim 23, further including a gauge operatively connected to the mower deck indicating the cutting height of the mower deck.

27. The system of claim 23, wherein the operator interface is operatively connected to the power vehicle.

28. The system of claim 23, wherein a portion of the plurality of orientations define a cutting height range.

* * * * *

UNITED STATES PATENT AND TRADEMARK OFFICE
CERTIFICATE OF CORRECTION

| | |
|---|---|
| PATENT NO. | : 7,669,395 B2 |
| APPLICATION NO. | : 11/638651 |
| DATED | : March 2, 2010 |
| INVENTOR(S) | : Todd Wehler and Wayne Shaw |

Page 1 of 1

It is certified that error appears in the above-identified patent and that said Letters Patent is hereby corrected as shown below:

Col. 10, claim 18, line 37, "tote" should read --to the--.

Signed and Sealed this

Eighth Day of June, 2010

David J. Kappos
*Director of the United States Patent and Trademark Office*